United States Patent
Swanson

(10) Patent No.: US 10,288,349 B2
(45) Date of Patent: May 14, 2019

(54) ASPHALT PRODUCTION PLANT WITH PRE-DRYER ASSIST

(71) Applicant: Astec Industries, Inc., Chattanooga, TN (US)

(72) Inventor: Malcolm L. Swanson, Chickamauga, GA (US)

(73) Assignee: Astec Industries, Inc., Chattanooga, TN (US)

( * ) Notice: Subject to any disclaimer, the term of this patent is extended or adjusted under 35 U.S.C. 154(b) by 362 days.

(21) Appl. No.: 15/356,047

(22) Filed: Nov. 18, 2016

(65) Prior Publication Data

US 2017/0145642 A1 May 25, 2017

Related U.S. Application Data

(60) Provisional application No. 62/304,559, filed on Mar. 7, 2016, provisional application No. 62/258,184, filed on Nov. 20, 2015.

(51) Int. Cl.
| | |
|---|---|
| *F26B 23/00* | (2006.01) |
| *F26B 3/04* | (2006.01) |
| *F26B 11/02* | (2006.01) |
| *F26B 17/32* | (2006.01) |
| *F26B 23/02* | (2006.01) |
| *E01C 19/10* | (2006.01) |

(52) U.S. Cl.
CPC ........ *F26B 23/002* (2013.01); *E01C 19/1036* (2013.01); *F26B 3/04* (2013.01); *F26B 11/028* (2013.01); *F26B 17/32* (2013.01); *F26B 23/02* (2013.01)

(58) Field of Classification Search
CPC .......... F26B 23/002; F26B 23/02; F26B 3/04; F26B 11/028; B26B 3/04; B26B 11/028; E01C 19/1004; E01C 19/1036; B01F 2215/0063
USPC .............................................................. 366/7
See application file for complete search history.

(56) References Cited

U.S. PATENT DOCUMENTS

| | | | | |
|---|---|---|---|---|
| 5,302,179 A | * | 4/1994 | Wagner ..................... | B09C 1/06 71/13 |
| 5,551,166 A | * | 9/1996 | Milstead ............. | E01C 19/1036 34/131 |
| 5,596,935 A | * | 1/1997 | Swanson ................... | B09C 1/06 110/235 |
| 2014/0373385 A1 | * | 12/2014 | Swanson ............. | F26B 11/0477 34/474 |

* cited by examiner

*Primary Examiner* — Marc C Howell
(74) *Attorney, Agent, or Firm* — Chambliss, Bahner & Stophel, P.C.

(57) ABSTRACT

A combination of components for use in making asphalt concrete from a mixture of virgin aggregate material with recycled asphalt products and/or recycled asphalt shingles encompasses a direct dryer for heating virgin aggregate material; a pre-dryer for heating recycled asphalt product and/or recycled asphalt shingles, said pre-dryer using warm exhaust gas from said direct dryer to heat the recycled asphalt product and/or recycled asphalt shingles; and means for conveying warm exhaust gas from said direct dryer to said pre-dryer.

5 Claims, 8 Drawing Sheets

ASPHALT PRODUCTION PLANT WITH PRE-DRYER ASSIST

CROSS-REFERENCE TO RELATED APPLICATIONS

The present application claims priority to U.S. Provisional Patent Application Ser. No. 62/258,184, filed Nov. 20, 2015, and claims priority to U.S. Provisional Patent Application Ser. No. 62/304,559, filed Mar. 7, 2016. The contents of both the foregoing provisional patent applications are incorporated herein by reference.

FIELD OF THE INVENTION

The present invention relates generally to the production of asphalt concrete using aggregate materials that may include a high proportion of recycled materials. More particularly, the present invention relates to a method and apparatus for making asphalt concrete from aggregate materials including a relatively high percentage of recycled asphalt product ("RAP") and/or recycled asphalt shingles ("RAS").

BACKGROUND OF THE INVENTION

Production facilities for making asphalt concrete to be used as a paving composition are well-known. Feed materials for these facilities include aggregate materials and asphalt cement. The aggregate materials may be provided in the form of virgin aggregate materials, and/or RAP, and/or RAS. If RAP and/or RAS are included in the feed materials, these components will also provide an additional source of asphalt cement.

Some conventional asphalt concrete production plants employ a rotating dryer drum in which virgin aggregate materials and/or RAP and/or RAS are introduced. A burner is located at one end of the drum and the input feed materials are moved along the drum through the heated gases generated by the burner in either parallel flow or counter-current flow to an outlet. A separate mixer, such as a rotating drum mixer or a pugmill, is employed to mix the heated and dried aggregate materials with liquid asphalt cement. Another type of asphalt concrete production plant employs a dryer/mixer that dries and heats the aggregate material and also mixes it with asphalt cement. One such type of dryer/mixer is the DOUBLE BARREL® brand dryer/mixer that is sold by Astec, Inc. of Chattanooga, Tenn. This dryer/mixer includes a generally cylindrical fixed outer drum and a heating chamber comprised of a generally cylindrical inner drum that is adapted to rotate with respect to the outer drum. A burner at one end of the inner drum heats aggregate material by direct exposure to the hot gases generated, and the heated aggregate material is discharged from the inner drum into the outer drum where it is mixed with asphalt cement and/or with RAP and/or RAS. If substantial quantities of RAP and/or RAS are introduced into the DOUBLE BARREL® brand dryer/mixer, a separate mixer such as a pugmill or mixing drum may be employed to add and incorporate additional asphalt cement into the mixture.

Because some conventional systems expose liquid asphalt cement and/or RAP and/or RAS aggregate materials to the high-temperature gases used for drying and heating the aggregate materials and to the steam generated in the drying process, emissions of smoke and volatile organic components ("VOC") are stripped from the light oil fractions of the asphalt cement components. In order to prevent these emissions from being discharged to the atmosphere, it has been deemed desirable, when only virgin aggregate materials are used, to either direct the emissions into the burner for incineration, or to filter the emissions from the plant exhaust gases and condense them for disposal. Even though counter-current flow is more thermally efficient than parallel flow, conventional asphalt concrete production plants that process aggregate materials containing a high percentage of RAP and/or RAS are generally operated in a parallel heat flow arrangement, where the aggregate materials to be heated and dried are carried through the dryer in the same direction as the heating gases, in order to minimize smoke and VOC emissions. In addition, exposure of high proportions of RAP and/or RAS aggregate materials to the high-temperature gases used for drying and heating the aggregate materials and to the steam generated in the drying process causes oxidation of the liquid asphalt on the RAP and/or RAS, which results in degrading the asphalt and any pavement materials made with it. This reduces the number of applications for which high-RAP content or high-RAS content asphalt concrete is considered suitable. Finally, conventional equipment that is used to make high-RAP content or high-RAS content asphalt concrete must generally be operated at a lower production rate than when the same equipment is used to make asphalt concrete with only small amounts of RAP and/or RAS or with all virgin aggregate materials.

It would be desirable if a method and apparatus for producing asphalt concrete from aggregate materials including a high percentage of RAP and/or RAS could be provided that would limit the emission of undesirable smoke and VOC. It would also be desirable if such a method and apparatus could be provided that would be more thermally efficient than conventional systems. It would also be desirable if such a method and apparatus could be provided that would minimize the oxidation of asphalt cement in high-RAP content and/or high-RAS content asphalt concrete, thereby making such products suitable for more paving applications. Furthermore, it would be desirable if such a method and apparatus could be provided that would allow the production of high-RAP content and/or high-RAS content asphalt concrete at production rates that are comparable to those obtained when only virgin aggregate materials are used.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Various terms are specifically defined herein. These terms are to be given their broadest possible construction consistent with such definitions, as follows:

The term "aggregate materials" and similar terms refer to crushed stone and other particulate materials that are used in the production of asphalt concrete, such as, for example, crushed limestone and other types of crushed stone, crushed Portland cement concrete, shredded or comminuted mineral and cellulosic fibers, RAP, RAS, gravel, sand, lime and other particulate additives. The term "virgin aggregate materials" refers to aggregate materials that do not include asphalt cement.

The term "asphalt cement" and similar terms refer to a bituminous material that is used in combination with aggregate materials in the production of asphalt concrete. Asphalt cement acts as the binder for various aggregate materials in the production of asphalt concrete.

The terms "recycled asphalt product", "RAP" and similar terms refer to a comminuted or crushed product containing aggregate materials bound together by asphalt cement. RAP typically comprises crushed or comminuted recycled asphalt paving materials.

The terms "recycled asphalt shingles", "RAS" and similar terms refer to crushed, shredded or comminuted asphalt roofing shingles and/or asphalt cement-containing products other than RAP.

The term "asphalt concrete" and similar terms refer to a bituminous paving mixture that is produced, using asphalt cement and/or RAP and/or RAS and any of various aggregate materials, in an asphalt dryer/mixer or other asphalt concrete production plant.

The term "direct dryer", "direct fired dryer" and similar terms refer to a dryer or dryer/mixer device having a burner at one end, which device is adapted to move input feed materials to be heated and/or dried along the device through the heated gases generated by the burner in either parallel flow or counter-current flow to an outlet.

The term "indirect dryer", "indirectly heated pre-dryer" and similar terms refer to a dryer or dryer/mixer device which is adapted to heat and/or dry input feed materials without such materials coming into direct contact with a burner flame or heated gases generated by a burner.

The term "downstream", as used herein to describe a relative position on or in connection with an asphalt concrete production facility or a component thereof, refers to a relative position in the direction of the movement of material, air or gases through the facility or component thereof.

The term "upstream", as used herein to describe a relative position on or in connection with an asphalt concrete production facility or a component thereof, refers to a relative position in a direction that is opposite to the direction of the movement of material, air or gases through the facility or component thereof.

SUMMARY OF THE INVENTION

The invention comprises a facility or combination of components for the production of asphalt concrete from aggregate materials including RAP and/or RAS. This combination includes a direct fired dryer for heating virgin aggregate materials, and a pre-dryer for indirectly heating RAP and/or RAS using at least a portion of the warm exhaust gas stream from the direct fired dryer.

According to one example embodiment of the present general inventive concept, a combination of components for use in making asphalt concrete from a mixture of virgin aggregate material with recycled asphalt products and/or recycled asphalt shingles encompasses a direct dryer for heating virgin aggregate material; a pre-dryer for heating recycled asphalt product and/or recycled asphalt shingles, said pre-dryer using warm exhaust gas from said direct dryer to heat the recycled asphalt product and/or recycled asphalt shingles; and means for conveying warm exhaust gas from said direct dryer to said pre-dryer.

According to one example embodiment of the present general inventive concept, a method for making asphalt concrete from a mixture of virgin aggregate material with recycled asphalt products and/or recycled asphalt shingles encompasses providing an assembly that includes a direct dryer for heating virgin aggregate material; a pre-dryer for heating recycled asphalt product and/or recycled asphalt shingles, said pre-dryer using warm exhaust gas from said direct dryer to heat the recycled asphalt product and/or recycled asphalt shingles; and means for conveying warm exhaust gas from said direct dryer to said pre-dryer; heating virgin aggregate material in said direct dryer; conveying warm exhaust gas from said direct dryer to said pre-dryer; heating recycled asphalt products and/or recycled asphalt shingles in said pre-dryer; and mixing the heated virgin aggregate material and the heated recycled asphalt products and/or recycled asphalt shingles.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described herein.

Advantages of the Invention

Among the advantages of the invention is that it provides a method and apparatus for producing asphalt concrete that limits the emission of undesirable smoke and VOC. Another advantage of the invention is that it provides a method and apparatus that is more thermally efficient than conventional systems used to produce asphalt concrete including RAP and/or RAS. Still another advantage of the invention is a significant improvement in the asphalt concrete quality of high-RAP content and/or high-RAS content mix designs. Asphalt concrete made with high-RAP content and/or high-RAS content materials according to the invention will be comparable in quality to asphalt concrete made with all virgin materials, due to a significant reduction in asphalt cement oxidation over that obtained when conventional methods and equipment are used.

Yet another advantage of the invention is that it permits the production of high-RAP content and/or high-RAS content asphalt concrete at production rates that are comparable to those obtained when only virgin aggregate materials are used.

Other advantages and features of this invention will become apparent from an examination of the drawings and the ensuing description.

BRIEF DESCRIPTION OF THE DRAWINGS

The presently preferred embodiments of the invention are illustrated in the accompanying drawings, in which like reference numerals represent like parts throughout, and wherein.

DESCRIPTION OF THE PREFERRED EMBODIMENTS OF THE INVENTION

Figure 1:
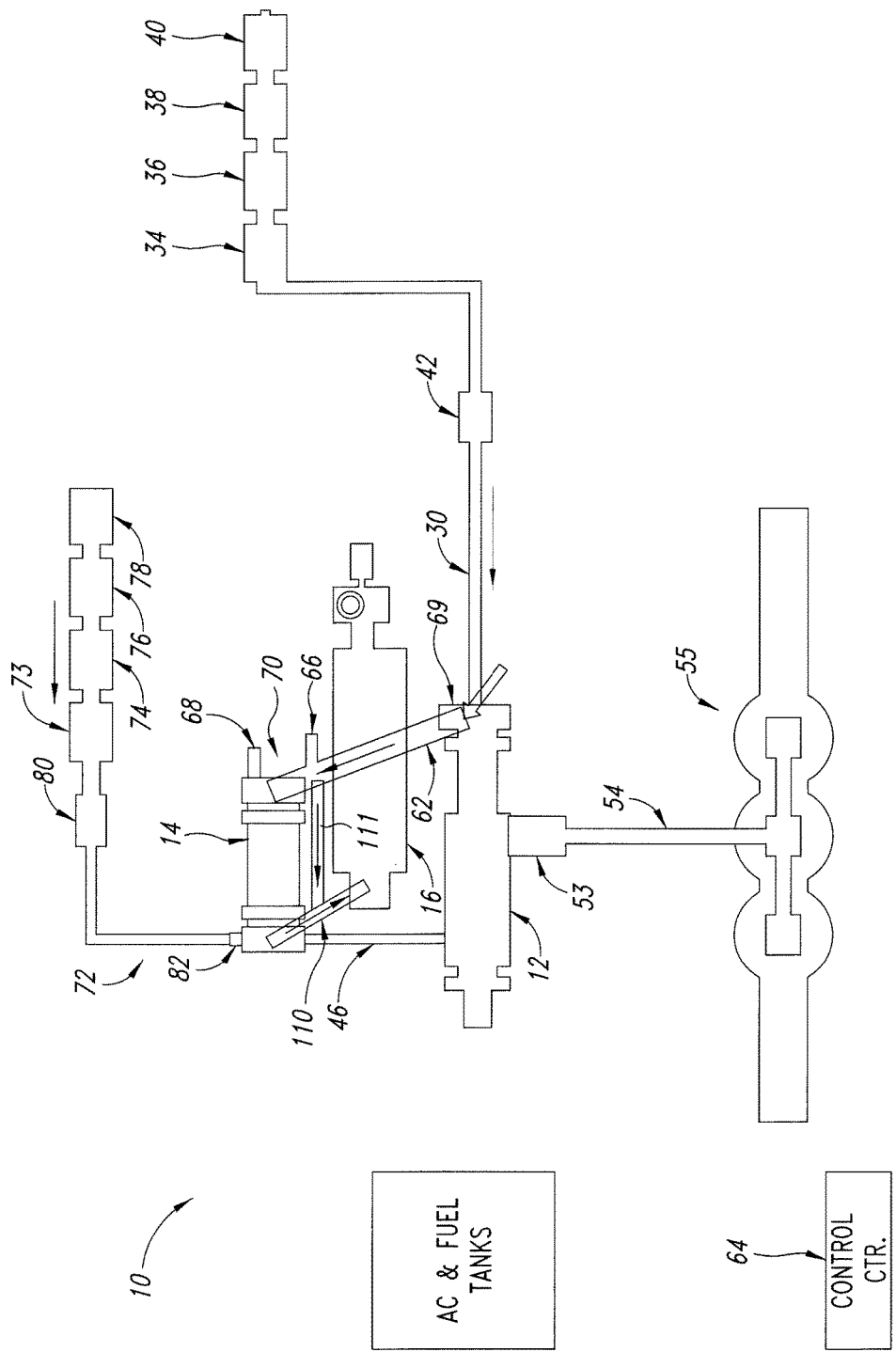
FIG. 1 is a schematic view of a first embodiment of a production facility or combination of components for the continuous production of asphalt concrete using RAP and/or RAS.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
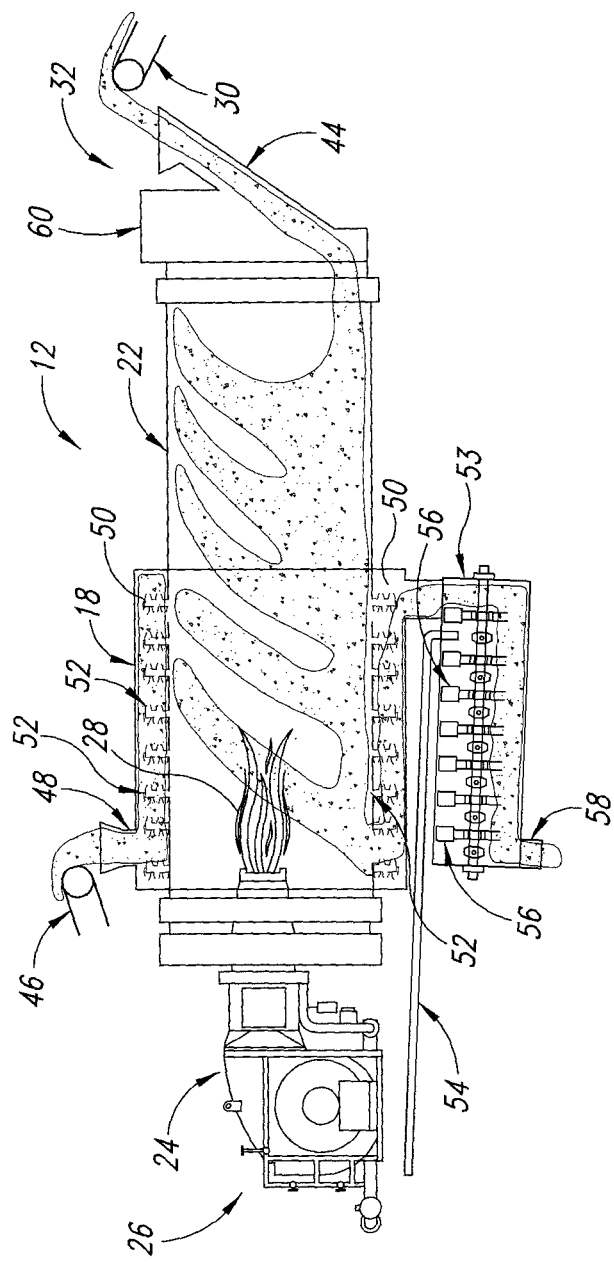
FIG. 2 is a sectional view of the direct dryer that is a part of the facility or combination shown in FIG. 1.

Preferred embodiments of the invention are illustrated in the drawings. As shown in FIG. 1, asphalt concrete production facility 10 includes dryer/mixer 12, pre-dryer 14 and bag house 16. Dryer/mixer 12 is preferably a DOUBLE BARREL® brand Model XHR dryer/mixer that is sold by Astec, Inc. of Chattanooga, Tenn. As shown in FIG. 2, dryer/mixer 12 includes a generally cylindrical fixed outer drum 18 mounted on an inclined frame (not shown), and a heating chamber comprised of generally cylindrical inner drum 22 that is adapted to rotate with respect to the outer drum. Inner drum 22 is rotatably mounted on the frame by a plurality of bearings (not shown) and is driven to rotate by a suitable drive system (also not shown). Preferably, this drive system comprises a variable frequency drive that is adapted to vary the rotational speed of inner drum 22 with respect to outer drum 18. A burner 24 at lower end 26 of the dryer/mixer (on the left side as viewed in FIG. 2) directs a flame 28 in a generally axial direction into the interior of inner drum 22. In a preferred embodiment of the invention, burner 24 is equipped with a variable frequency drive (not shown) that is adapted to vary the amount of excess air in burner 24 as well as its firing rate. Such variable frequency drives are described in U.S. Pat. No. 8,863,404 (incorporated herein by reference).

Conveyor 30 at upper end 32 of dryer/mixer 12 (on the right side as viewed in FIG. 2) is adapted to deliver virgin aggregate material from supply bins 34, 36, 38 and 40 past weigh scale 42 and into inner drum 22 through chute 44. Each of supply bins 34, 36, 38, 40 is preferably equipped with a variable speed feeder that can control the discharge of material from the bin onto conveyor 30.

The interior of the inner drum 22 is functionally separated into a combustion zone located in the vicinity of burner flame 28 and a drying zone located between the combustion zone and the upper end 32 of dryer/mixer 12. Because upper end 32 of dryer mixer 12 is elevated above lower end 26, the aggregate material delivered into the interior of the inner drum through chute 44 will move towards the lower end as the inner drum rotates. Preferably, inner drum 22 includes a plurality of V-flights such as are described and shown in U.S. Pat. No. 8,863,404 on its inner surface.

Conveyor 46 at lower end 26 of the dryer/mixer (on the left side as viewed in FIG. 2) is adapted to deliver pre-heated RAP and/or RAS from pre-dryer 14 through chute 48 into mixing chamber 50 between outer drum 18 and inner drum 22. At the lower end of inner drum 22 are located a plurality of openings through which heated and dried virgin aggregate may pass from inner drum 22 into mixing chamber 50 between inner drum 22 and outer drum 18. Inner drum 22 also supports a plurality of mixing paddles 52 extending into mixing chamber 50. Material delivered through chute 44 is thoroughly mixed with material delivered through chute 48 in the mixing chamber, and this material is then conveyed into an external mixer such as pugmill 53, where the mixture of pre-heated RAP and/or RAS and virgin aggregate materials is further mixed with asphalt cement that is delivered to the pugmill through supply line 54 from asphalt cement storage 55. Mixing paddles 56 thoroughly mix the asphalt cement with the aggregate materials in pugmill 53, and they also convey the mixture towards product outlet 58.

Combustion products and exhaust gases generated during the operation of dryer/mixer 12 rise out of the inner drum 22 through exhaust gas outlet 60 and are conveyed to pre-dryer 14 by conduit 62 (shown in FIG. 1). In this embodiment of the invention, it is preferred that a controller (not shown, but described in U.S. Pat. No. 8,863,404, and located in control center 64) be adapted to control the temperature of the exhaust gases from dryer/mixer 12 that pass through exhaust gas outlet 60 by regulating the variable frequency drive systems on inner drum 22 and burner 24.

Dryer/mixer 12 may be operated so that the exhaust gas temperature changes approximately inversely to the rotational speed of the inner drum. In asphalt production facility 10, the controller (not shown but located in control center 64) is adapted to control the variable frequency drive of dryer/mixer 12 in order to control the rotational speed of inner drum 22. The temperature of the exhaust gases passing through outlet 60 can be varied by approximately 100° F. by increasing and decreasing the rotational speed of inner drum 22 of dryer/mixer 12. More particularly, in this preferred embodiment of the invention, the rotational speed of the inner drum of dryer/mixer 12 has a base level of approximately 8 rotations per minute. When the exhaust gas temperature of the gases passing through outlet 60 falls below a predetermined minimum temperature with the rotational speed of the inner drum set at the base level, the controller may be operated to reduce the inner drum rotational speed to increase the exhaust gas temperature. When the exhaust gas temperature rises above a predetermined maximum temperature with the inner drum rotational speed at the base level, the controller may be operated to increase the inner drum rotational speed to decrease the exhaust gas temperature of the gases passing through exhaust gas outlet 60.

In a preferred embodiment of the invention, the controller is also adapted to control the variable frequency drive of burner 24 in order to control the amount of excess air in the burner. More particularly, in the event that the exhaust gas temperature cannot be sufficiently increased or decreased by altering the rotational speed of inner drum 22, the controller may vary the amount of excess air in burner 24. In asphalt concrete production facility 10, an increase in the amount of excess air in burner 24 increases the temperature of exhaust gases passing through exhaust gas outlet 60, and a decrease in the amount of excess air in the burner decreases the temperature of these exhaust gases. Preferably, the amount of excess air in burner 24 may be varied from an excess air baseline by approximately ±10%. As a consequence of the changed heat demand caused by the variation of the amount of burner excess air and the variation of the rotational speed of inner drum 22, the firing rate of burner 24 may also vary.

It may be desirable, in some circumstances, to provide one or more supplemental burners to increase the temperature of the gases passing through exhaust gas conduit 62 into pre-dryer 14. Thus, as shown in FIG. 1, exhaust burner 66, which communicates directly with exhaust gas conduit 62, and pre-dryer burner 68, which is mounted directly onto pre-dryer 14, may be employed to increase the temperature of the gasses passing through exhaust gas conduit 62 into pre-dryer 14. Thus, as shown in FIG. 1, optional exhaust burner 66 is located so that it does not generate exhaust gases and products of combustion that directly contact the RAP and/or RAS in pre-dryer 14, and optional pre-dryer burner 68 is adapted to be operated at a sufficiently low temperature that the recycled materials in pre-dryer 14 will not be heated to a temperature that is likely to cause oxidation of the asphalt cement or the emission of VOC and smoke. If supplemental burners, such as burners 66 and/or 68, are employed, their operation is preferably controlled by the controller in control center 64.

A fresh-air inlet 69 equipped with a damper (not shown) is located at the top of exhaust gas outlet 60. This allows fresh air to be admitted to conduit 62 under suction from the exhaust fan (not shown) of conventional bag house 16, since the bag house is in fluid communication with pre-dryer 14 by way of bag house conduit 110. Preferably, the operation of the dryer/mixer, optional supplemental burners such as exhaust burner 66 and/or pre-dryer burner 68, and the damper position of fresh-air inlet 69 are operated by the controller to vary the temperature of the exhaust gases entering pre-dryer 14 at gas inlet 70 (also shown in FIG. 3) within the range of 300°-600° F.

Preferably, the oxygen content of the warm exhaust gases from dryer 12 is about 8.5% to 10.5% prior to the introduction of these warm exhaust gases into pre-dryer 14. This reduced oxygen content reduces oxidation of the asphalt cement in the RAP and/or RAS and also reduces VOC emissions.

Conveyor 72 is adapted to deliver RAP and/or RAS from supply bins 73, 74, 76 and 78 past weigh scale 80 and into pre-dryer 14 through chute 82. Each of supply bins 73, 74, 76 and 78 is preferably equipped with a variable speed feeder that can control the discharge of material from the bin onto conveyor 72.

Figure 3:
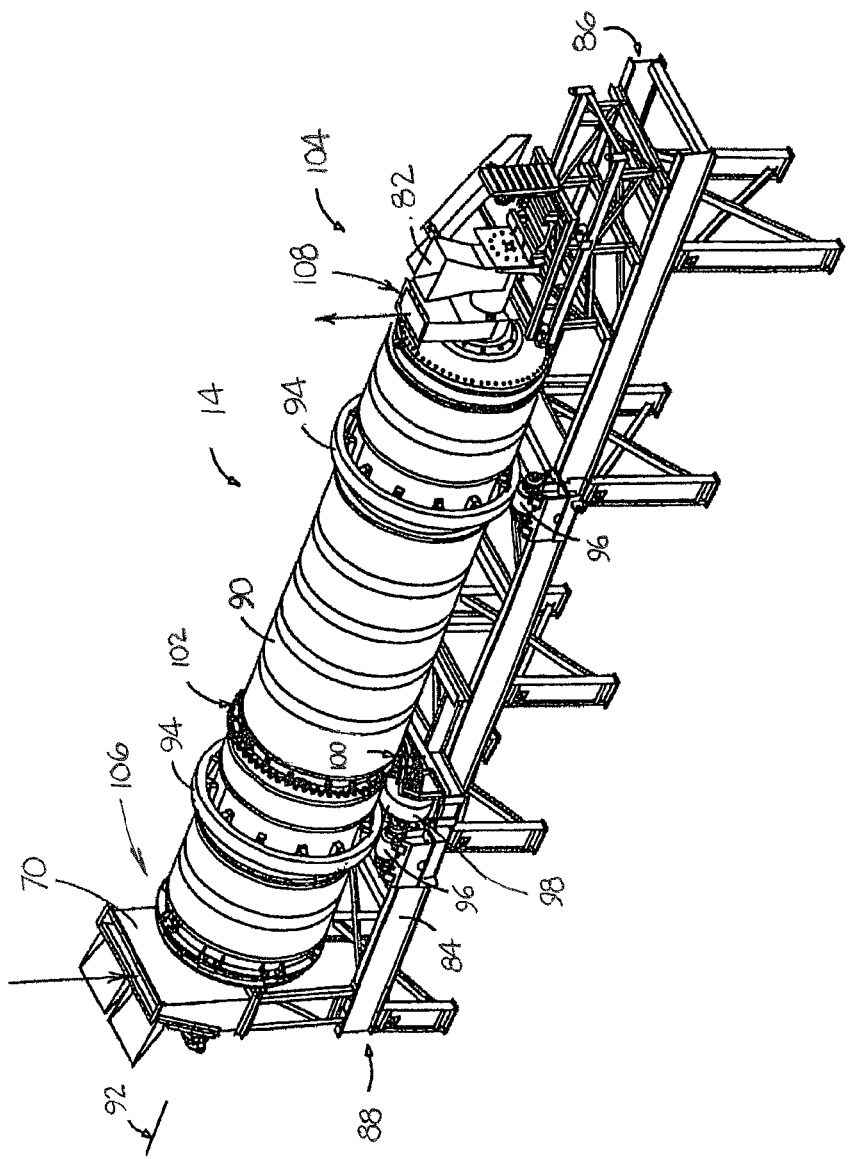
FIG. 3 is a perspective view of the pre-dryer that is part of the facility or combination illustrated in FIG. 1.

As shown in FIG. 3, pre-dryer 14 includes frame 84 having upper end 86 and lower end 88. Generally cylindrical pre-dryer drum 90 is mounted on dryer frame 84 for rotation about axis 92. Dryer drum 90 includes a pair of outer rings 94 that engage trunnions 96 on dryer frame 84. A variable drive motor (not shown) is adapted to rotatably drive a pair of sprockets (also not shown, but one of which is enclosed within housing 98) that are connected by and in driving engagement with drive chain 100 which engages sprocket 102 mounted on the outer surface of the drum to rotate pre-dryer drum 90 in a conventional manner. Alternative drive systems such as are known to those having ordinary skill in the art to which the invention relates may also be employed to rotate pre-dryer drum 90 with respect to dryer frame 84.

Because pre-dryer drum 90 is mounted on frame 84 having a frame upper end 86 and a frame lower end 88, the axis 92 of the drum is oriented downwardly from upper end 104 of pre-dryer drum 90 to lower end 106 of the drum. Upper end 104 of dryer drum 90 is provided with inlet chute 82 for RAP and/or RAS material to be indirectly heated therein; consequently, upper end 104 is also the upstream end of drum 90. Because upper end 104 of dryer drum 90 is elevated above lower end 106, the RAP and/or RAS aggregate material delivered into the interior of the pre-dryer drum through chute 82 will move towards the lower end as the drum 90 rotates. Preferably, the inner surface of drum 90 includes a plurality of V-flights such as are described and shown in U.S. Pat. No. 8,863,404. Furthermore, the preferred controller is also adapted to control the rate of rotation of dryer drum 90.

Because the temperature of the counter-flow gases entering pre-dryer 14 are preferably within the range of 300°-600° F., the preferred controller may control the rotation of drum 90 so that the pre-dryer will warm the recycled materials passing therethrough to a temperature of about 150° F., while reducing the moisture content of the recycled materials by about 1-2% from the typical 5%. Of course, it is contemplated within the scope of the invention that the pre-dryer may operate in a parallel flow manner. In some circumstances, parallel flow through the pre-dryer is the preferred embodiment. In either event, because of the relatively low operating temperature of the pre-dryer, the recycled materials therein will not be heated to a temperature that is likely to cause oxidation of the asphalt cement or the emission of VOC and smoke. Exhaust gases from the pre-dryer will exit the pre-dryer through discharge chute 108 for conveyance to bag house 16 through conduit 110. The bag house 16 is operated in a conventional manner to process the exhaust gases from the pre-dryer.

If it is desired to operate dryer/mixer 12 without also operating pre-dryer 14, bypass conduit 111 may be used (with suitable valves) to transport the exhaust gases in conduit 62 to bag house conduit 110. This circumstance might arise, for example, if RAP or RAS materials are not available for inclusion in the product.

Figure 4:
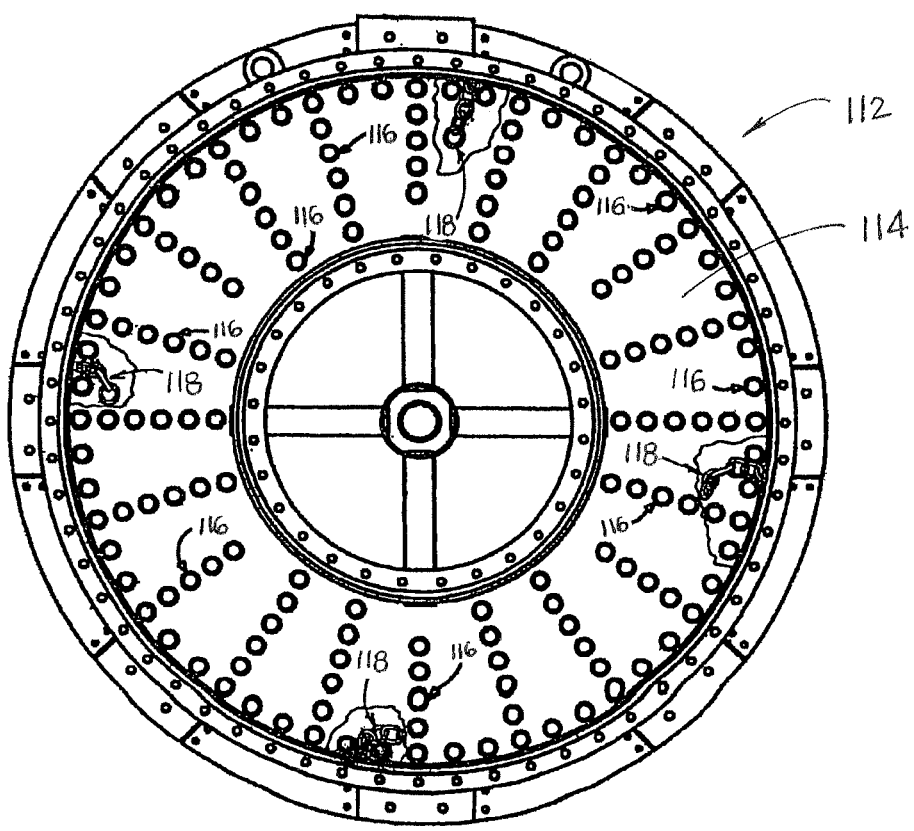
FIG. 4 is an end view of an alternative to the pre-dryer shown in FIG. 3, showing an arrangement of thermal tubes therein.

As shown in FIG. 4, an alternative pre-dryer drum 112 is provided with a pair of end walls, one of which, end wall 114 is shown in the drawing. These end walls support a plurality of parallel thermal tubes 116 that extend along the interior of the drum and are adapted to convey exhaust gases from conduit 62 through the pre-dryer drum to a discharge chute similar to chute 108 of pre-dryer 14. Preferably, thermal tubes 116 have an outer diameter of about two inches and a wall thickness of about 0.2 inches. Furthermore, they are preferably provided in such number so that they present 50-100 square feet of surface area per foot of length of the pre-dryer drum. In one embodiment of the invention, pre-dryer drum 112 is of such length that the plurality of thermal tubes 116 extending along the interior thereof present 2500-3500 square feet of heated surface area for contact with the tumbling recycled material, although other embodiments of the invention may have more or less total tube surface area.

Pre-dryer drum 112 also includes a cleaning system comprised of kiln chains 118 or similar agitation devices that are installed in several sections of the interior of the pre-dryer. Such chains are preferably attached at both ends, but of sufficient length that at least a portion of each chain can slide around inside the pre-dryer, wiping asphalt cement off of the interior surfaces while it is still hot and liquefied to keep the inside surface of the pre-dryer and the thermal tubes located near the inside surface of the pre-dryer clean. The number, location, length and size of the chains may be varied depending on the type of material processed. Furthermore, pre-dryer 14 could also be fitted with chains similar to those shown in FIG. 5 for essentially the same purpose.

Figure 5:
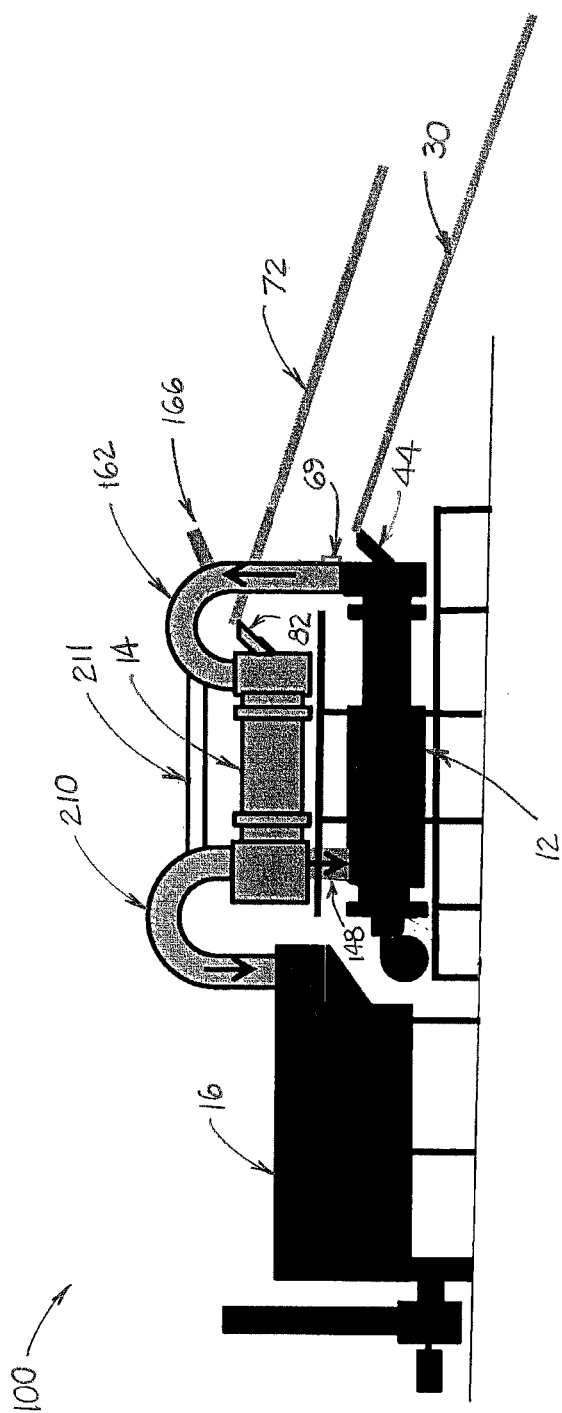
FIG. 5 is a schematic view of a second embodiment of a production facility or combination of components for the production of asphalt concrete using RAP and/or RAS.

An alternative embodiment of the components of facility 10 is shown in FIG. 5. As shown therein, asphalt concrete production facility 100 includes dryer/mixer 12, pre-dryer 14 and bag house 16. Conveyor 30 is adapted to deliver virgin aggregate material from one or more supply bins (not shown in FIG. 5) into the inner drum of dryer/mixer 12 through chute 44, and conveyor 72 is adapted to deliver RAP and/or RAS from one or more supply bins (also not shown) into pre-dryer 14 through chute 82. Chute/conveyor 148 at lower end 26 of the dryer/mixer (on the left side as viewed in FIG. 5) is adapted to deliver pre-heated RAP and/or RAS from pre-dryer 14 into the mixing chamber between the outer drum and the inner drum of dryer/mixer 12. Material delivered through chute 44 is thoroughly mixed with material delivered through chute/conveyor 148 in the mixing chamber, and this material is then conveyed into an external mixer such as a pugmill (not shown in FIG. 5), where the mixture of pre-heated RAP and/or RAS and virgin aggregate materials is further mixed with asphalt cement.

Combustion products and exhaust gases generated during the operation of dryer/mixer 12 rise out of the inner drum through exhaust gas outlet 60 and are conveyed to pre-dryer 14 by conduit 162. In this embodiment of the invention, it is preferred that a controller (not shown, but described in U.S. Pat. No. 8,863,404) be adapted to control the temperature of the exhaust gases from dryer/mixer 12 that pass through exhaust gas outlet 60 by regulating the variable frequency drive systems on the inner drum and burner of dryer/mixer 12. Supplemental burner 166 is provided to increase the temperature of the gases passing through exhaust gas conduit 162 into pre-dryer 14. If is necessary or desirable to employ supplemental burner 166, its operation is preferably controlled by the controller.

A fresh-air inlet 69 equipped with a damper (not shown) is located at the top of outlet 60. This allows fresh air to be admitted to conduit 162 under suction from the exhaust fan (not shown) of conventional bag house 16, since the bag house is in fluid communication with the pre-dryer by way of bag house conduit 210. Preferably, the operation of the dryer/mixer, optional supplemental burner 166, and the damper position of fresh-air inlet 69 are operated by the controller to vary the temperature of the exhaust gases entering pre-dryer 14 at gas inlet 70 (shown in FIG. 3) within the range of 300°-600° F.

Conveyor 72 is adapted to deliver RAP and/or RAS from one or more supply bins into pre-dryer 14 through chute 82. If it is desired to operate dryer/mixer 12 without also operating pre-dryer 14 in this embodiment of the invention, bypass conduit 211 may be used (with suitable valves) to transport the exhaust gases in conduit 162 to bag house conduit 210. This circumstance might arise, for example, if RAP or RAS materials are not available for inclusion in the product.

Figure 6:
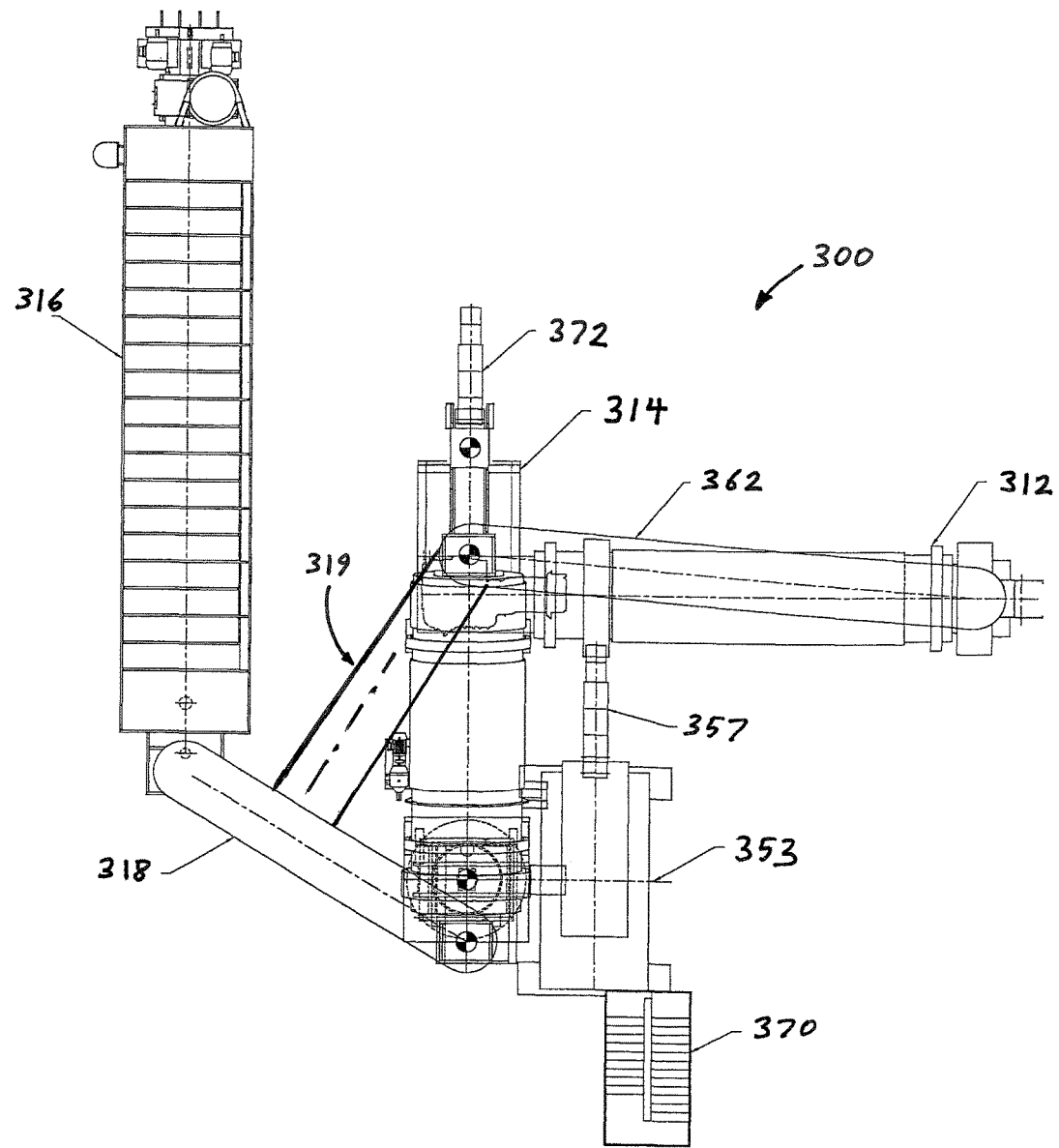
FIG. 6 is a top view of a third embodiment of a production facility or combination of components for the batch production of asphalt concrete using RAP and/or RAS.
Figure 7:
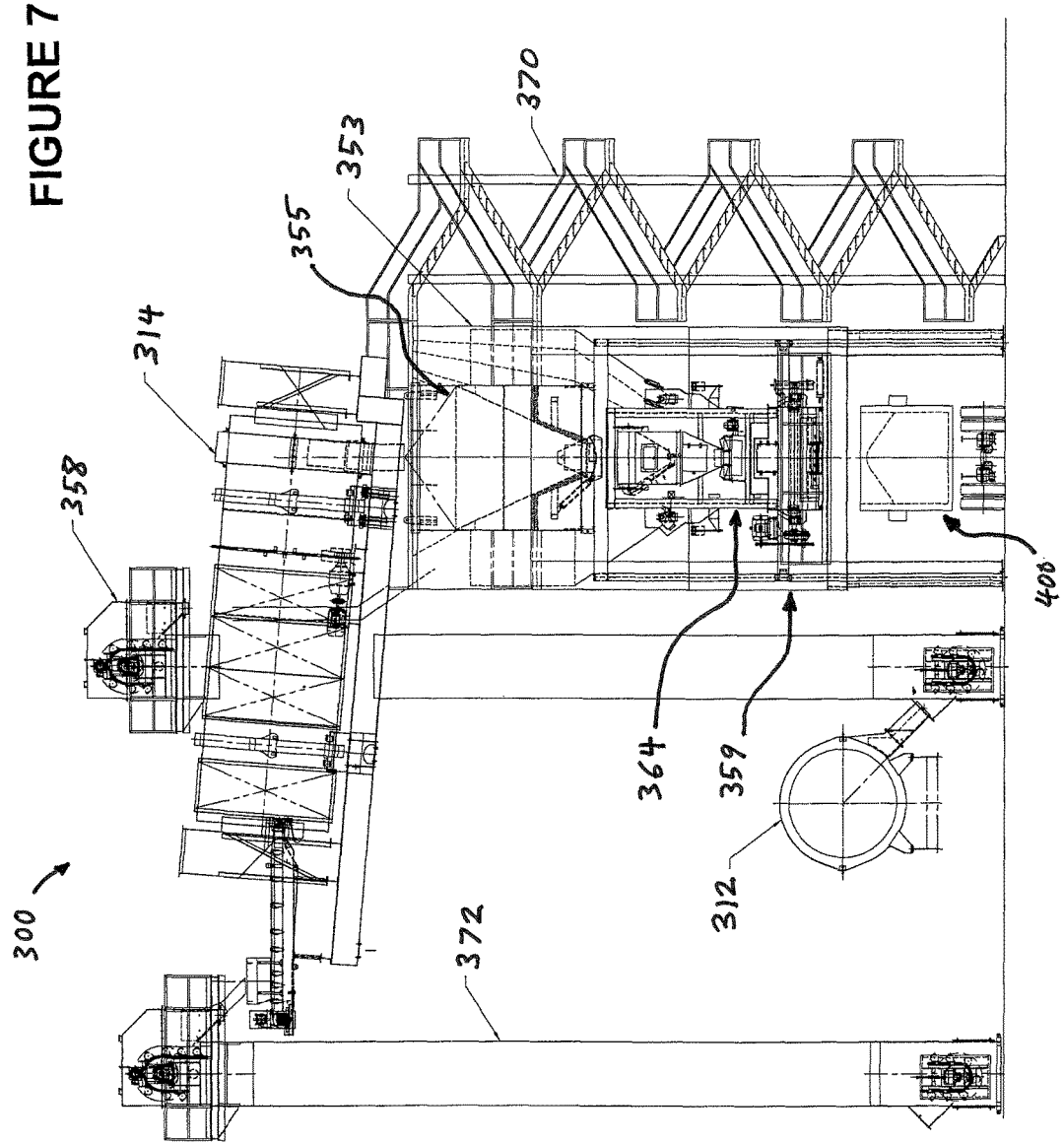
FIG. 7 is a side view of the embodiment shown in FIG. 6.
Figure 8:
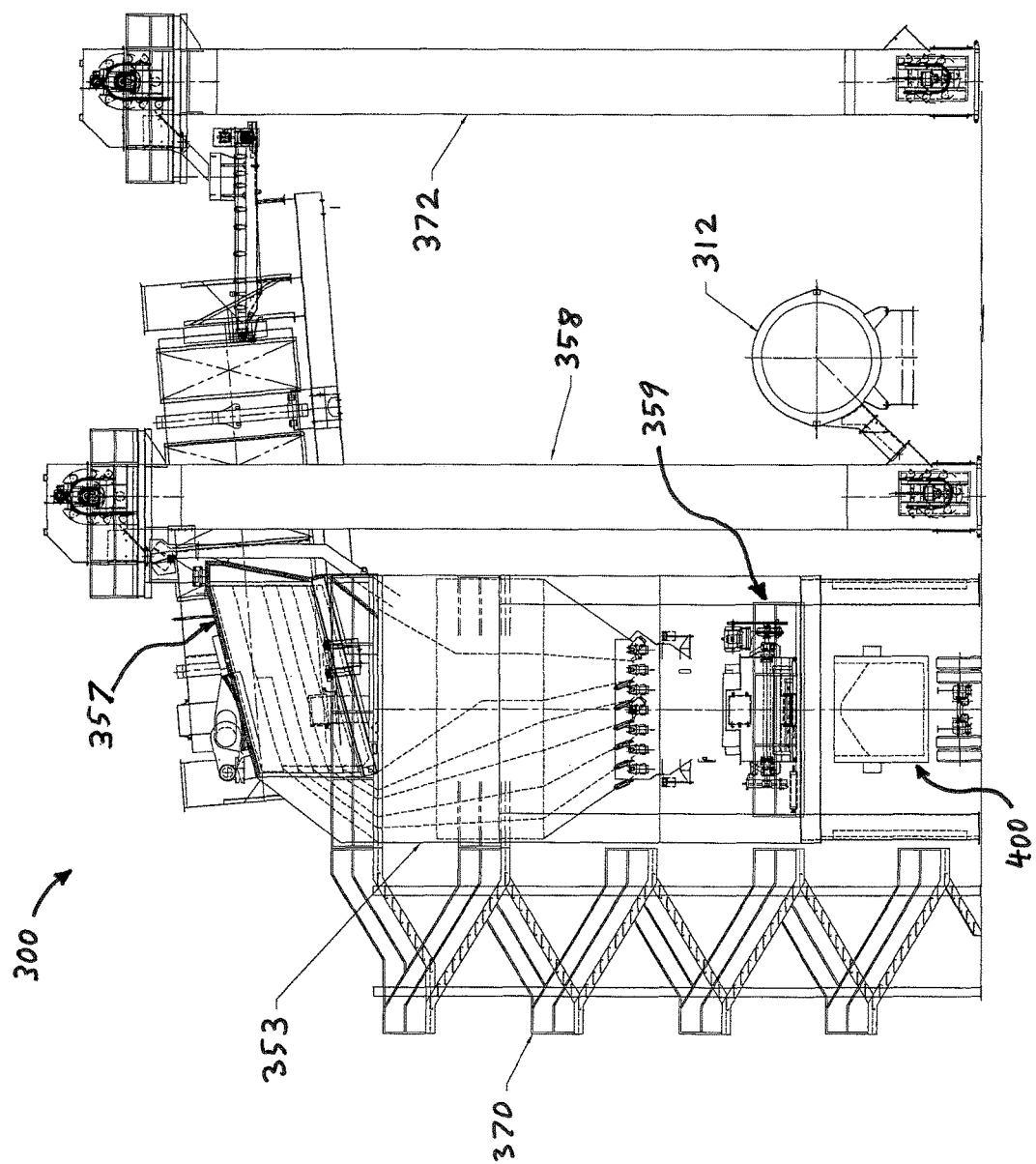
FIG. 8 is a second side view of the embodiment shown in FIGS. 6 and 7, taken from the opposite side from the view shown in FIG. 7.

The example embodiments illustrated generally in FIGS. 1-5 are directed toward continuous production asphalt plants. An alternative embodiment of the present general inventive concept, directed to batch plants, is shown in FIGS. 6-8. As shown in FIG. 6, the batch plant facility 300 includes dryer/mixer 312, pre-dryer 314, and bag house 316. Dryer/mixer 312 is preferably a DOUBLE BARREL® brand Model XHR dryer/mixer that is sold by Astec, Inc. of Chattanooga, Tenn. An aggregate elevator 358 (shown in FIGS. 7 and 8) conveys heated and dried virgin aggregate material from dryer/mixer 312 to screen deck 357 (shown in FIG. 8) within batch tower 353, and heated and dried virgin aggregate material passes through the screen deck 357 to arrive at external mixer/pugmill 359. RAP elevator 372 conveys RAP and/or RAS to pre-dryer 314. As shown in FIG. 8, heated RAP and/or RAS is conveyed from pre-dryer 314 to batch tower 353, where heated RAP and/or RAS is passed by way of RAP surge bin 355 and RAP weigh system 364 to external mixer/pugmill 359, where the RAP and/or RAS is mixed with heated and dried virgin aggregate material, and optionally with asphalt cement from a separate source, before being deposited in truck 400 or other means of transport for mixed asphalt material. The batch plant 300 also generally includes stairs 370.

As described above with reference to the continuous production asphalt plant facilities, the pre-dryer 314 uses warm exhaust gas from dryer/mixer 312 to dry the RAP and/or RAS. Combustion products and exhaust gases generated during the operation of dryer/mixer 312 are conveyed to pre-dryer 314 by exhaust gas conduit 362 (shown in FIG. 6). In this embodiment of the invention, it is preferred that a controller (not shown, but described in U.S. Pat. No. 8,863,404) be adapted to control the temperature of the warm exhaust gases from dryer/mixer 312 that pass through exhaust gas conduit 362 by regulating the operation of components within the dryer/mixer 312, as described above.

If it is desired to operate dryer/mixer 312 without also operating pre-dryer 314, bypass conduit 319 may be used (with suitable valves) to direct the combustion products and warm exhaust gases in from the exhaust gas conduit 362 to bag house conduit 318 and from there to bag house 316 (as shown in FIG. 6). This circumstance might arise, for example, if RAP or RAS materials were not available for inclusion in the product.

Systems, assemblies, facilities, and combinations of components according to the present general inventive concept allow for a number of improvements and refinements in the production of asphalt incorporating RAP and/or RAS compared to conventional systems. For example, embodiments of the present invention allow for the use of RAP fines as a substitute for sand and dust normally incorporated into the virgin aggregate material. RAP fines are very rich in liquid asphalt cement content, which makes their use desirable. However, in conventional systems, when RAP fines are introduced into the mix design, their introduction results in emissions with high exhaust temperatures that exceed the tolerances of the bag house. When using a pre-dryer according to the invention, these same high temperature emissions can be conveyed to the pre-dryer and used to heat and dry the RAP and/or RAS. In this way, the high exhaust temperatures that result from the introduction of RAP fines to the virgin aggregate are turned from a liability to an asset.

In some embodiments, RAP fines are mixed with the RAP and/or RAS within the pre-dryer. The RAP fines provide a high surface area and therefore enhance heat transfer within the pre-dryer.

Thus, it may be seen that methods, systems, assemblies, facilities, and combinations of components according to the present general inventive concept, as described above, allow for the production of asphalt concrete from aggregate materials including a high percentage of RAP and/or RAS while limiting the emission of undesirable smoke and VOC. Various embodiments as described herein also provided means for producing asphalt concrete from aggregate materials including a high percentage of RAP and/or RAS that are more thermally efficient than conventional systems. Further, various embodiments as described above minimize the oxidation of asphalt cement in high-RAP content and/or high-RAS content asphalt concrete, thereby making such products suitable for more paving applications. Furthermore, various embodiments as described above allow the production of high-RAP content and/or high-RAS content asphalt concrete at production rates that are comparable to those obtained when only virgin aggregate materials are used.

Accordingly, in some embodiment of the present general inventive concept, a combination of components for use in making asphalt concrete from a mixture of virgin aggregate material with recycled asphalt products and/or recycled asphalt shingles encompasses a direct dryer for heating virgin aggregate material; a pre-dryer for heating recycled asphalt product and/or recycled asphalt shingles, said pre-dryer using warm exhaust gas from said direct dryer to heat the recycled asphalt product and/or recycled asphalt shingles; and means for conveying warm exhaust gas from said direct dryer to said pre-dryer.

In some embodiments, the combination of components is used in a continuous asphalt production system.

In some embodiments, the combination of components is used in a batch asphalt production system.

In some embodiments, said direct dryer comprises a drum dryer.

In some embodiments, said direct dryer comprises a mixer having a fixed outer drum and a rotating inner drum.

In some embodiments, the temperature of warm exhaust gas from said direct dryer is adjusted by adjusting the rotational speed of said rotating inner drum of said direct dryer Some embodiments further include a burner to further heat said warm exhaust gas before the warm exhaust gas reaches said pre-dryer.

Some embodiments further include a burner to further heat said warm exhaust gas within said pre-dryer.

In some embodiments, said means for conveying warm exhaust gas from said direct dryer to said pre-dryer include an exhaust gas conduit.

In some embodiments, the oxygen content of the warm exhaust gas from said direct dryer is limited in order to reduce the emission of volatile organic compounds and oxidation of asphalt cement in the recycled asphalt products and/or recycled asphalt shingles.

In some embodiments, the oxygen content of the warm exhaust gas from said direct dryer is from 8.5% to 10.5% before the warm exhaust gas is used by said pre-dryer, whereby emission of volatile organic compounds and oxidation of asphalt cement in the recycled asphalt products and/or recycled asphalt shingles are reduced.

In some embodiments of the present general inventive concept, an assembly for use in making asphalt concrete from a mixture of virgin aggregate material with recycled asphalt products and/or recycled asphalt shingles includes a combination mixer and dryer to heat virgin aggregate material and to mix heated virgin aggregate material with heated recycled asphalt product and/or recycled asphalt shingles; a pre-dryer for heating recycled asphalt product and/or recycled asphalt shingles prior to the introduction of recycled asphalt product and/or recycled asphalt shingles to the combination mixer and dryer, said pre-dryer using warm exhaust gas from said direct dryer to heat the recycled asphalt product and/or recycled asphalt shingles; a conduit for conveying warm exhaust gas from said combination mixer and dryer to said pre-dryer; means for conveying heated recycled asphalt product and/or recycled asphalt shingles from said pre-dryer to said combination mixer and dryer; and a pugmill adapted to receive and combine the mixture of heated virgin aggregate material with heated recycled asphalt product and/or recycled asphalt shingles.

In some example embodiments of the present general inventive concept, a method for making asphalt concrete from a mixture of virgin aggregate material with recycled asphalt products and/or recycled asphalt shingles encompasses providing an assembly that includes a direct dryer for heating virgin aggregate material; a pre-dryer for heating recycled asphalt product and/or recycled asphalt shingles, said pre-dryer using warm exhaust gas from said direct dryer to heat the recycled asphalt product and/or recycled asphalt shingles; and means for conveying warm exhaust gas from said direct dryer to said pre-dryer; heating virgin aggregate material in said direct dryer; conveying warm exhaust gas from said direct dryer to said pre-dryer; heating recycled asphalt products and/or recycled asphalt shingles in said pre-dryer; and mixing the heated virgin aggregate material and the heated recycled asphalt products and/or recycled asphalt shingles.

In some embodiments, recycled asphalt fines are mixed with the virgin aggregate material and/or with the recycled asphalt products and/or recycled asphalt shingles.

In some embodiments, the direct dryer comprises a mixer having a fixed outer drum and a rotating inner drum and the temperature of warm exhaust gas from said direct dryer is adjusted by adjusting the rotational speed of said rotating inner drum of said direct dryer.

In some embodiments, the direct dryer includes a direct dryer burner and the temperature of warm exhaust gas from said direct dryer is adjusted by adjusting a level of air in said direct dryer burner.

Although this description contains many specifics, these should not be construed as limiting the scope of the invention but as merely providing illustrations of the presently preferred embodiments thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A method for making asphalt concrete, said method comprising:
   (a) providing an assembly that includes
      (i) a direct dryer for heating virgin aggregate material, said direct dryer being adapted to generate warm exhaust gas while heating said virgin aggregate material;
      (ii) a pre-dryer for heating recycled asphalt product and/or recycled asphalt shingles, said pre-dryer using the warm exhaust gas from said direct dryer to heat the recycled asphalt product and/or recycled asphalt shingles; and
  (iii) means for conveying the warm exhaust gas from said direct dryer to said pre-dryer;
(b) heating the virgin aggregate material in said direct dryer;
(c) conveying the warm exhaust gas from said direct dryer to said pre-dryer;
(d) heating the recycled asphalt products and/or recycled asphalt shingles in said pre-dryer by indirect contact with the warm exhaust gas; and
(e) mixing the heated virgin aggregate material and the heated recycled asphalt products and/or recycled asphalt shingles.

2. The method of claim 1 wherein the heated virgin aggregate material and the heated recycled asphalt products and/or recycled asphalt shingles are mixed with an additional amount of asphalt cement.

3. The method of claim 1 wherein recycled asphalt fines are mixed with the recycled asphalt products and/or recycled asphalt shingles.

4. The method of claim 1 which includes:
(a) providing an assembly wherein the direct dryer comprises a fixed outer drum and a rotating inner drum;
(b) providing an assembly that includes a controller that is adapted to:
  (i) operate the direct dryer by rotating the inner drum of the direct dryer at a base level of approximately 8 rotations per minute;
  (ii) reduce the rotational speed of the inner drum when the temperature of the warm exhaust gas generated by the direct dryer falls below a predetermined minimum temperature;
  (iii) increase the rotational speed of the inner drum when the temperature of the warm exhaust gas generated by the direct dryer rises above a predetermined maximum temperature.

5. The method of claim 1 which includes:
(a) providing an assembly wherein the direct dryer includes a direct dryer burner;
(b) providing an assembly that includes a controller which is adapted to:
  (i) increase the amount of excess air in the direct dryer burner when the temperature of the warm exhaust gas generated by the direct dryer falls below a predetermined minimum temperature;
  (ii) decrease the amount of excess air in the direct dryer burner when the temperature of the warm exhaust gas generated by the direct dryer rises above a predetermined maximum temperature.

* * * * *